United States Patent [15] 3,688,121
Ott [45] Aug. 29, 1972

[54] SHIELDED OPTICAL SYSTEM FOR VIEWING AN ILLUMINATED DEVICE PRODUCING PENETRATING RADIATION

[72] Inventor: John Nash Ott, Sarasota, Fla.
[73] Assignee: John Ott Laboratories, Inc.
[22] Filed: Sept. 9, 1970
[21] Appl. No.: 70,731

[52] U.S. Cl. ..................................250/108 R, 250/77
[51] Int. Cl. ..............................................G21f 3/00
[58] Field of Search..................250/77, 80, 71.5, 108; 178/5.8, 7.85, 7.91; 313/64, 92, 112

[56] References Cited

UNITED STATES PATENTS 2,912,587  11/1959  Daly ........................250/77 X
1,870,702  8/1932   Zworykin ..................178/5.8
3,443,138  5/1969   Schwartz ...............250/108 X
3,036,154  5/1962   Harman.....................178/7.91
3,344,276  9/1967   Balding.........................250/80
3,446,916  5/1969   Abel et al. .................178/7.85

Primary Examiner—Archie R. Borchelt
Attorney—Richard E. Hosley

[57] ABSTRACT

To eliminate penetrating radiation hazard from high-voltage cathode-ray tubes used in television sets, a reflector disposed in the radiation beam reflects visible light to a viewer outside the path of the beam. Radiation penetrating the reflector is absorbed by a shield on the back of the reflector. Additional shielding adsorbs radiation which does not impinge on the reflector, whereby the tube image may be viewed with complete protection from radiation.

5 Claims, 2 Drawing Figures

PATENTED AUG 29 1972      3,688,121

INVENTOR
JOHN NASH OTT
BY
Richard E. Horley
ATTORNEY

SHIELDED OPTICAL SYSTEM FOR VIEWING AN ILLUMINATED DEVICE PRODUCING PENETRATING RADIATION

BACKGROUND OF THE INVENTION

The present invention relates to a shielded optical system for viewing devices producing harmful penetrating radiation such as X-rays. It is particularly well adapted as a system for viewing picture tubes of television sets without exposing the viewer or others near the set to harmful X-rays or other penetrating radiation emitted by the television receiver.

It is known that cathode-ray tubes used in television sets and other electronic display devices produce X-rays. The X-rays produced by low-voltage tubes do not have much energy and so are mostly absorbed by the walls of the tube. However, when higher voltages of the order of 25,000 to 30,000 volts are used, as in color television sets, the X-rays generated have sufficient energy to penetrate the tube walls and so become a radiation hazard to viewers and others in the area of the television set. Public concern with the problem of such radiation pollution produced by electronic devices is evidenced by the enactment of Public Law 90–602 known as the "Radiation Control for Health and Safety Act of 1968." This act is designed to study and control "electronic product radiation" and covers "any ionizing or non-ionizing electromagnetic or particulate radiation." In order to prevent possible damage to the gonads and other vital organs of the body by such radiation, exposure rate limits have been established at 0.5 mrh at a distance of 5 cm from the picture tube under normal conditions. It is not definitely known that this is a safe limit for all conditions and the subject is receiving intense study at the present time.

Tests have shown that low-level X-ray emission from TV sets produces biological responses in plants and animals, suggesting that the above-mentioned radiation limit may be too high. It has also been found that relatively small fluctuations of power supply voltage above the rated television set voltage may cause a substantial increase in the X-ray output of the picture tube. Such fluctuations are relatively common as the power supply system load varies between peak load and off-peak periods. Also X-ray output beyond the established limit may occur because of defective manufacture or improper servicing of a television set. Still further, the growing multiple use of TV sets in hospitals, hotels, motels, apartment houses and TV showrooms greatly increases the likelihood of overexposure due to the cumulative effect of many X-ray generators in relatively close quarters. It is, therefore, desirable to eliminate such radiation hazards.

Accordingly, it is an object of the present invention to provide a viewing system for television sets and other electronic devices producing harmful radiation which permits complete shielding of the radiation source and therefore eliminates the radiation hazard.

Another object of the invention is to provide a shielded optical system for viewing radiation producing devices which is relatively simple, and can be manufactured at low cost.

Further objects and advantages of the invention will become apparent as the following description proceeds.

SUMMARY

Briefly, in accordance with the invention a light reflector is used to reflect visible light from a radiation source, such as TV tube, to a viewer located outside of the path of a beam of penetrating radiation, such as X-rays, emanating from the source. Radiation passing through the reflector is absorbed by a shield placed on the back of the reflector. Additional shielding disposed around the radiation source may be used to absorb additional penetrating radiation which does not impinge on the reflector whereby complete shielding is obtained while permitting observation of radiation source.

DESCRIPTION OF THE ILLUSTRATED EMBODIMENT

Figure 1:
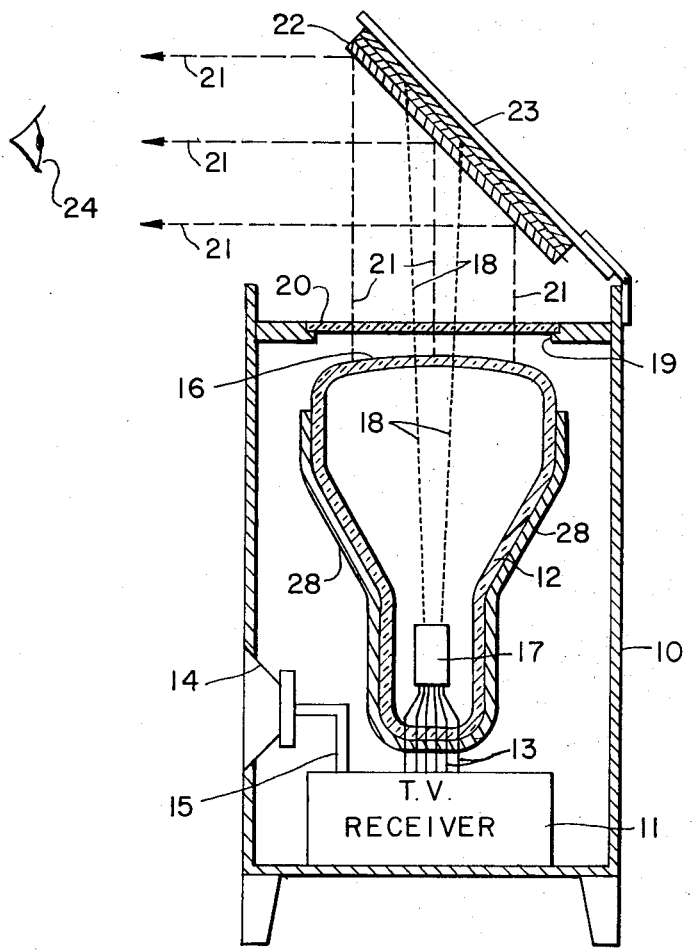
FIG. 1 is a side elevation sectional view, partly schematic, of a television receiver provided with a shielded optical system for viewing the picture tube constructed in accordance with the invention.

Referring to FIG. 1 of the drawing there is shown a television set provided with a shielded viewing system embodying the present invention. The set itself has conventional components which are illustrated schematically. As shown, the set comprises a cabinet 10 having electronic receiving apparatus 11 generating picture signals fed to a cathode-ray picture tube 12 through connections 13. The receiving apparatus 11 also provides sound signals to a loud speaker 14 on the front of the set through connections 15.

The picture tube 12 has a viewing face 16 on which the picture to be viewed is produced in a conventional manner by action of an electron beam sweeping a phosphor coating on the inner surface of the tube face. The electron beam is produced by one or more electron guns 17 disposed in the end of the tube opposite the viewing face. The tube also includes the usual focusing and scanning electrodes (not shown) by means of which electron beam is caused to scan the viewing face in synchronism with the received television signals to produce the picture image to be displayed.

It is known that electron guns used in cathode-ray tubes produce X-rays. The wavelength and energy generated are determined by the voltage, current and the material bombarded by the electrons from the gun, specifically its atomic number. Picture tubes used in color television receivers commonly use voltages in the range of 25,000 to 30,000 volts and measured X-ray emissions from color television receivers are known to have energies in the range from 22,000 to 28,000 electron volts. Such energies are sufficient to cause X-rays and other penetrating radiation to pass through the viewing face 16 and to be projected as a beam indicated by the dotted lines 18.

In the conventional TV set the picture tube is horizontally mounted so that viewing face is vertical and is viewed from the front of the set. Thus, the viewer is directly in the path of X-rays passing through the tube face. Since X-rays are attenuated by passing through air the exposure of the viewer varies with his distance from the tube. Exposure rate limits for television sets now being manufactured are commonly set at 0.5 mrh at a distance of 5 cm from the tube. However, even minute radiation may be harmful since it is the integrated dosage that affects the gonads and other vital body organs. Variables, such as viewing distance, viewing hours, and absorption by body tissues are involved making the determination of a safe exposure rate for all conditions difficult. Obviously, it is desirable to eliminate entirely emission of harmful penetrating rays. However, any shielding placed over the tube face that is sufficient to absorb all radiation would also obscure the picture to be viewed and is impracticable for that reason.

According to the invention, the coincident beams of visible light and penetrating radiation emanating from the face of the picture tube are separated by a reflector. This technique permits the penetrating radiation to be shielded completely without impairing the visibility of the image from the picture tube. The manner in which this is accomplished will now be described.

It will be noted that the picture tube 12 is rotated 90° from its usual horizontal position. As illustrated in FIG. 1 the axis of the tube is vertical in that the viewing face 16 faces the top of the set. In this position the picture image passes through an aperture 19 in the top wall of the cabinet which may, if desired, be covered by a transparent plate 20. Light rays from the image are indicated by the dash lines 21. Disposed in the path of the light rays 21 and the X-ray beam 18 is a light reflector 22. The light reflector is supported on a hinged member 23 which may also act as a closeable top of the television set. The member 23 is maintained in the position illustrated by suitable adjusting means (not shown) so that the reflector 22 is positioned at the proper angle to reflect the visible light rays 21 from the tube face 16 to the eye 24 of a viewer located outside the path of X-ray beam 18. Any reversal of the picture image by action of the reflector can be corrected by selection of the proper polarity of the scanning signal leads from the receiving apparatus 11 to the picture tube.

Figure 2:
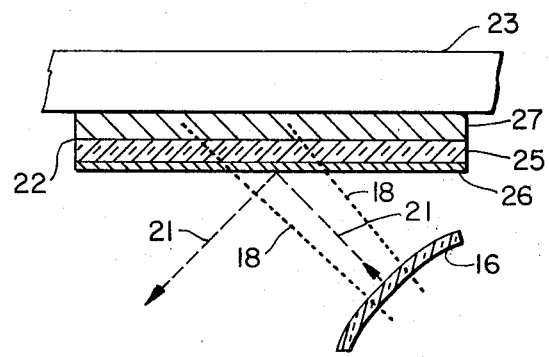
FIG. 2 is an enlarged sectional view of the reflector forming a part of the system of FIG. 1, illustrating certain constructional details of the reflector and the manner in which visible light is reflected and penetrating radiation absorbed by the reflector.

The construction of the light reflector is shown in greater detail in FIG. 2. As illustrated, the reflector consists of a mirror formed by a sheet of glass 25 on which is deposited a thin layer of light-reflecting material 26 such as silver. The mirror is backed by shielding means external with respect to the cabinet comprising a layer 27 of material which will absorb X-rays and other penetrating radiation emitted by the picture tube. Preferably, the backing material is formed of sheet lead or other material with a high atomic number having good capacity for absorbing penetrating radiation.

As best shown in FIG. 2, light rays 21 from tube face 16 are reflected at right angles to the path of X-ray beam 18 by the reflecting coating 26. The X-rays in beam 18 coming from the inside of cathode-ray tube 12 are not reflected but penetrate the relatively thin layers of glass and silver and pass into the shielding material 27 where they are dissipated by photoelectric absorption. The reason for this is that X-rays are not reflected as such; rather, they are either completely absorbed or are scattered with or without reduction of energy, after having been diverted from their original paths by interaction with electrons in the atoms of the absorbing material. Within the energy range of 22,000 to 28,000 electron volts, mentioned above, the predominant mode of interaction of X-rays with lead is photoelectric absorption with very little Compton scattering of the X-ray beam. Generally speaking, the intensity of radiation produced from scattered radiation is less than one-thousandth of the incident radiation at equal distances. On the other hand, the light rays 21 from the tube face 16 are reflected by the silver coating with little dispersion or reduction in intensity. Thus, the observer is able to view the image in the picture tube without exposure to X-rays which are absorbed by the reflector.

In order to protect the viewer and others in the vicinity of the television set from X-rays emanating from the television receiver other than those which impinge on the reflector 22, additional shielding internal with respect to the cabinet may be provided. This may take the form of a protective coating 28 of lead or other suitable material imperious to X-rays surrounding all parts of tube 12 except the tube face 16 as illustrated in FIG. 1. Alternatively, the additional shielding may take the form of an absorption lining, such as lead, extending around the inside of cabinet 10. The latter form may be preferable if parts of the electronic apparatus 11 also act as X-ray generators.

It will be understood that the invention is not limited to the illustrated arrangement wherein the axis of the picture tube is vertical. Thus, the tube axis may occupy other positions in a plane generally perpendicular to the line or sight from the viewer with corresponding changes in the position of the reflector. For example, the viewing face 16 of the tube may face either side of the set or downward toward the bottom.

From the foregoing, it will be apparent that a simple and reliable optical viewing system has been provided which permits complete shielding of a television set or other source of harmful penetrating radiation without impairing the intensity or quality of the viewed image.

While there has been described and shown what is considered to be a preferred embodiment of the invention, it will be apparent to those skilled in the art that various changes and modifications may be made therein without departing from the spirit and scope of the invention.

What is claimed as new and desired to be secured by Letters Patent of the United States is:

1. A shielded optical system for viewing images produced by a cathode ray tube without exposure to X-rays produced by said tube, said system comprising:
   a cabinet having a wall portion with a viewing aperture therein,
   a cathode ray tube having a viewing face, said tube being mounted in said cabinet so that said viewing face is adjacent said aperture,
   internal shielding means arranged to prevent emission outside of said cabinet of X-rays emitted by said tube other than those emitted from said viewing face which pass through said aperture,
   a. a light reflector mounted outside of said cabinet adjacent said aperture on a support and arranged to be positioned at an angle so that said images produced on said viewing face will be reflected outside of said cabinet to a viewer, and b. external shielding means comprising an X-ray shield mounted on said reflector in contiguous relation therewith formed of material which will absorb X-rays emitted from the viewing face of said tube which pass through said aperture outside of said cabinet and impinge on said reflector, said shield being disposed on the back side of said reflector with respect to said viewing face whereby the visibility of said images reflected to the viewer is not impaired by said X-ray shield.

2. A shielded optical system as set forth in claim 1 wherein the shield forms a backing of the reflector.

3. A shielded optical system as set forth in claim 1 wherein the cathode ray tube is the picture tube of a television receiver.

4. A shielded optical system as set forth in claim 1 wherein the X-ray shield is made of a material containing lead forming a backing of the reflector.

5. A shielded optical system as set forth in claim 1 wherein the internal shielding means is a protective coating of material impervious to X-rays surrounding all parts of the tube except the viewing face.

* * * * *